United States Patent
Morris et al.

(10) Patent No.: US 7,149,935 B1
(45) Date of Patent: Dec. 12, 2006

(54) METHOD AND SYSTEM FOR MANAGING DETECTED CORRUPTION IN STORED DATA

(75) Inventors: J. Mark Morris, Poway, CA (US); Eric Shank, San Diego, CA (US)

(73) Assignee: NCR Corp., Dayton, OH (US)

( * ) Notice: Subject to any disclaimer, the term of this patent is extended or adjusted under 35 U.S.C. 154(b) by 543 days.

(21) Appl. No.: 10/321,003

(22) Filed: Dec. 17, 2002

(51) Int. Cl.
*G06F 11/00* (2006.01)

(52) U.S. Cl. .............................. 714/54; 714/8
(58) Field of Classification Search ............. 714/6, 714/54, 42, 8
See application file for complete search history.

(56) References Cited

U.S. PATENT DOCUMENTS

| | | | |
|---|---|---|---|
| 5,796,933 A * | 8/1998 | Aitoniemi | 714/1 |
| 6,134,655 A * | 10/2000 | Davis | 713/1 |
| 6,505,188 B1 * | 1/2003 | Ghazal et al. | 707/2 |
| 6,505,307 B1 * | 1/2003 | Stell et al. | 714/6 |
| 6,687,791 B1 * | 2/2004 | Morrison | 711/130 |
| 6,907,466 B1 * | 6/2005 | Alexander et al. | 709/232 |
| 2002/0059540 A1 * | 5/2002 | Mann et al. | 714/11 |
| 2004/0078632 A1 * | 4/2004 | Infante et al. | 714/5 |

\* cited by examiner

*Primary Examiner*—Scott Baderman
*Assistant Examiner*—Joshua Lohn
(74) *Attorney, Agent, or Firm*—Baker Botts, LLP (57) ABSTRACT

A method, computer program, and computer system are disclosed for managing data corruption identified by an application in a storage subsystem. Data requested of the application by a process is copied from a primary storage device in the storage subsystem to a memory. A data integrity check is performed on the data stored in the memory. If the data integrity check succeeds, the data is provided from the application to the process. If the data integrity check fails: the data requested by the process and stored on the primary storage device in the storage subsystem is identified; the data requested by the process and stored on a redundant storage device in the storage subsystem is identified; the data stored in the memory, the identified data stored on the primary storage device, and the identified data stored on the redundant storage device are compared as the first, second, and third copies, respectfully; and at least one of a group of instructions is chosen to be transmitted from the application to the storage subsystem based at least in part on the comparison of the first, second, and third copies.

36 Claims, 5 Drawing Sheets

METHOD AND SYSTEM FOR MANAGING DETECTED CORRUPTION IN STORED DATA

BACKGROUND

Database systems and other application-level software store data, such as user data, for later use by the application. The computer system executing the application includes the storage devices to which that data is sent. Some computer systems and storage devices include features intended to decrease the chance that data will be lost, however these data storage methods operate at a lower level than the application data. For example, one conventional data storage method is Redundant Array of Independent Disks or RAID. In a computer system employing RAID, data is distributed across a group of computer disk drives that function as a single storage unit. When operating correctly, all the information stored on each of the disks is duplicated on other disks in the array. This redundancy attempts to ensure that no information will be lost if one of the disks fails.

SUMMARY

In general, in one aspect, the invention features a method for managing data corruption identified by an application in a storage subsystem. Data requested of the application by a process is copied from a primary storage device in the storage subsystem to a memory. A data integrity check is performed on the data stored in the memory. If the data integrity check succeeds, the data is provided from the application to the process. If the data integrity check fails: the data requested by the process and stored on the primary storage device in the storage subsystem is identified; the data requested by the process and stored on a redundant storage device in the storage subsystem is identified; the data stored in the memory, the identified data stored on the primary storage device, and the identified data stored on the redundant storage device are compared as the first, second, and third copies, respectfully; and at least one of a group of instructions is chosen to be transmitted from the application to the storage subsystem based at least in part on the comparison of the first, second, and third copies.

In general, in another aspect, the invention includes a database system for managing data corruption identified by a database application. The system includes one or more nodes and a plurality of CPUs. Each of the one or more nodes provides access to one or more CPUs. The system includes a plurality of virtual processes. Each of the one or more CPUs provides access to one or more virtual processes. Each virtual process is configured to manage data, including rows from database tables, stored in one of a plurality of data-storage facilities. At least a portion of the data is stored in both primary and redundant storage devices in the data storage facilities. A database application is coupled to the virtual processes. The database application is configured to copy data requested by a virtual process from a primary storage device in the data storage facilities to a memory. The database application is also configured to perform a data integrity check on the data stored in the memory. The database application is also configured to provide the data to the virtual process, if the data integrity check succeeds. If the data integrity check fails, the database application is configured to: identify the data requested by the virtual process and stored on the primary storage device; identify the data requested by the virtual process and stored on a redundant storage device in the data storage facilities; compare the data stored in the memory as a first copy, the identified data stored on the primary storage device as a second copy, and the identified data stored on the redundant storage device as a third copy; and choose at least one of a group of instructions to be transmitted to the in the data storage facilities based at least in part on the comparison of the first, second, and third copies.

In general, in another aspect, the invention features a computer program stored in a tangible medium for managing data corruption identified by an application in a storage subsystem. The computer program includes instructions that are executable by a computer. The instructions cause the computer to copy data requested of the application by a process from a primary storage device in the storage subsystem to a memory. A data integrity check is performed on the data stored in the memory. If the data integrity check succeeds, the data is provided from the application to the process. If the data integrity check fails: the data requested by the process and stored on the primary storage device in the storage subsystem is identified; the data requested by the process and stored on a redundant storage device in the storage subsystem is identified; the data stored in the memory, the identified data stored on the primary storage device, and the identified data stored on the redundant storage device are compared as the first, second, and third copies, respectfully; and at least one of a group of instructions is chosen to be transmitted from the application to the storage subsystem based at least in part on the comparison of the first, second, and third copies.

DETAILED DESCRIPTION

Figure 1:
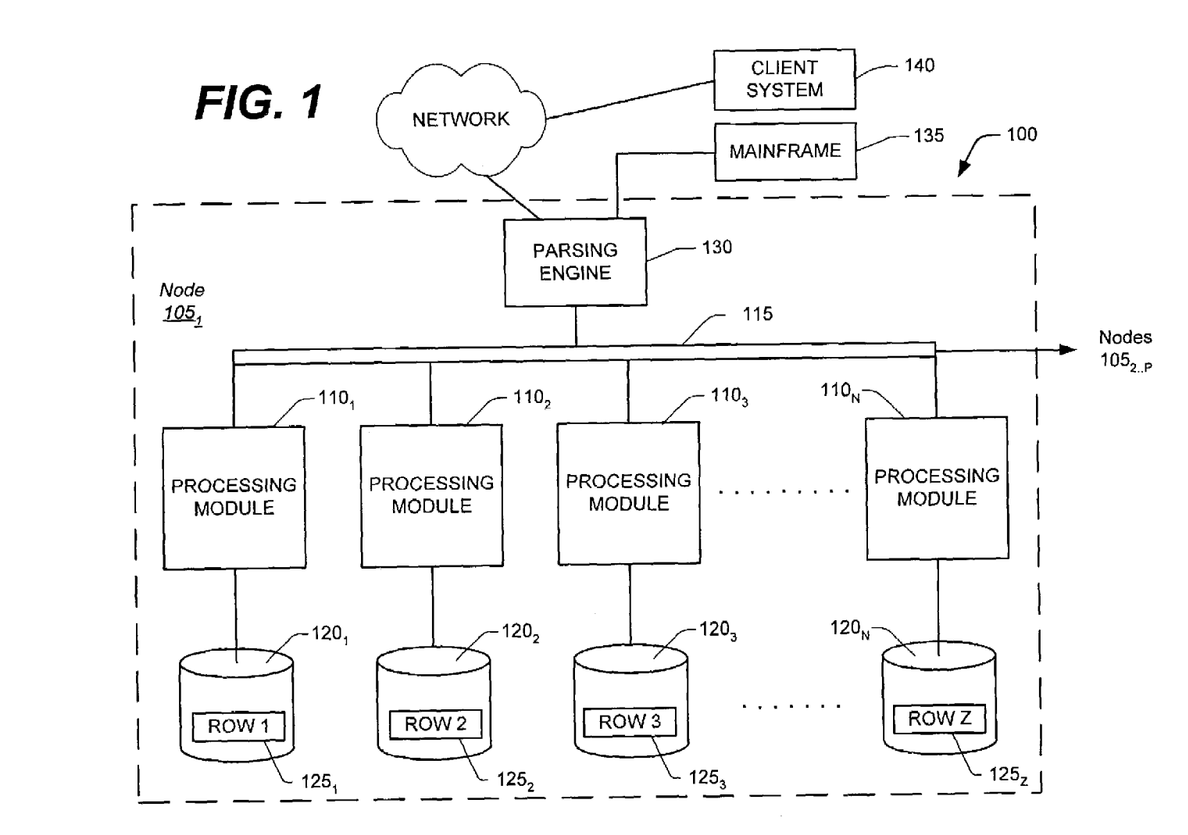
FIG. 1 is a block diagram of a node of a parallel processing database system.

The data corruption response technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_1 ... _N$ manages a portion of a database that is stored in a corresponding one of the data-storage facilities $120_1 ... _N$. Each of the data-storage facilities $120_1 ... _N$ includes one or more disk drives. The DBS may include multiple nodes $105_2 ... _N$ in addition to the illustrated node $105_1$, connected by extending the network 115.

The system stores data in one or more tables in the data-storage facilities $120_1 ... _N$. The rows $125_1 ... _Z$ of the tables are stored across multiple data-storage facilities $120_1 ... _N$ to ensure that the system workload is distributed evenly across the processing modules $110_1 ... _N$. A parsing engine 130 organizes the storage of data and the distribution of table rows $125_1 ... _Z$ among the processing modules $110_1 ... _N$. The parsing engine 130 also coordinates the retrieval of data from the data-storage facilities $120_1 ... _N$ in response to queries received from a user at a mainframe 135 or a client computer 140. The DBS 100 usually receives queries and commands to build tables in a standard format, such as SQL.

In one implementation, the rows $125_1 ... _Z$ are distributed across the data-storage facilities $120_1 ... _N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_1 ... _N$ and associated processing modules $110_1 ... _N$ by a hash bucket map. The characteristics of the columns chosen for the primary index determine how evenly the rows are distributed.

Figure 2:
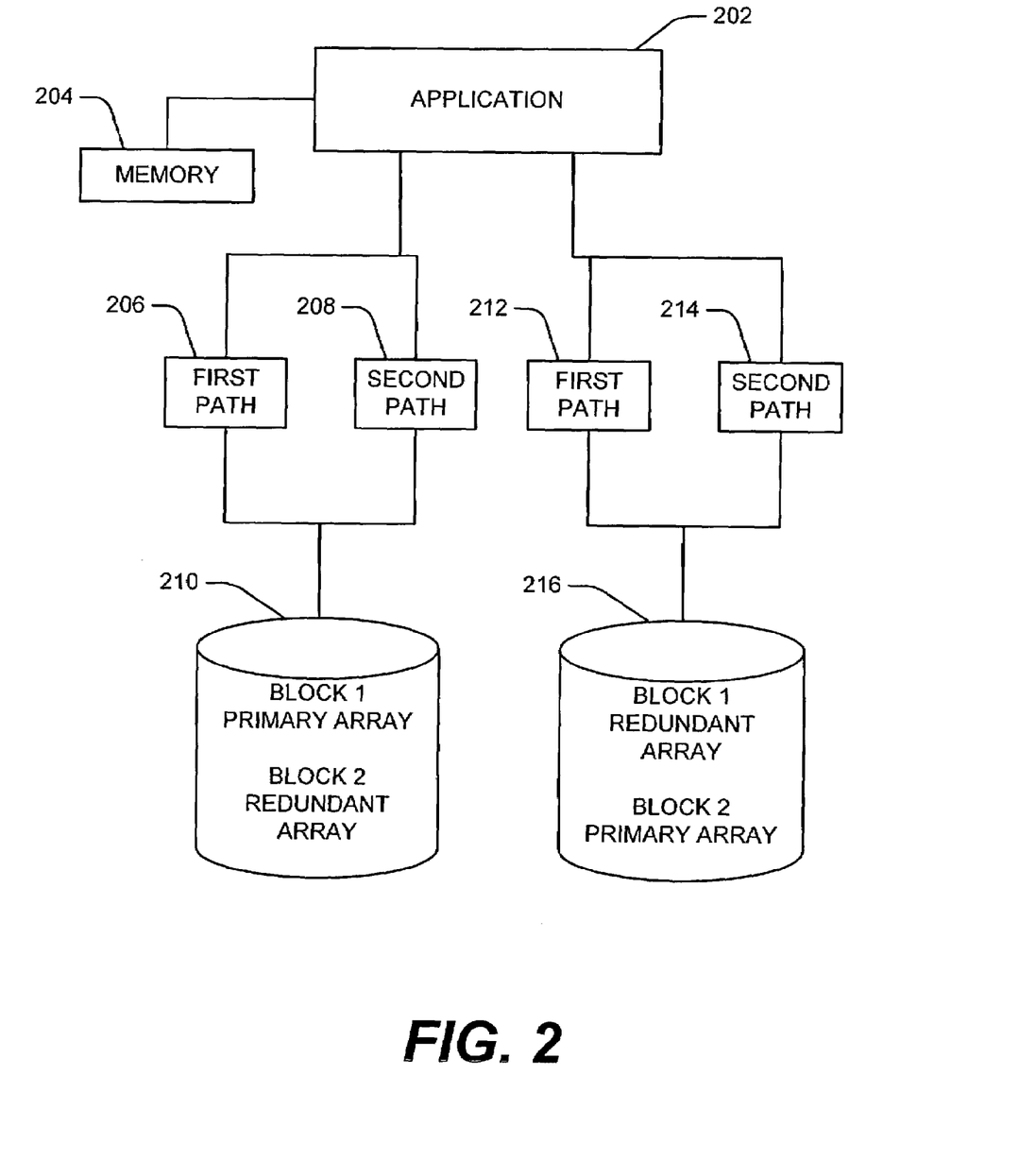
FIG. 2 is a communications diagram of a computer application and associated data handling devices.

In addition to the physical division of storage among the storage facilities illustrated in FIG. 1, a further division of storage into primary and redundant storage can be implemented. FIG. 2 depicts is a communications diagram of a computer application and associated data handling devices. An application 202 is coupled to memory 204 in which data can be temporarily stored. The application 202 is also coupled to a first storage device 210 and a second storage device 216 and can be coupled to others as well. In one implementation, the storage devices are arrays of hard disks. In one implementation, the application 202 generates processes for accomplishing data manipulation tasks. The processes can request stored data from the application 202 that is needed for the specific task(s) assigned to the process. For example, a process generated to update the values in specific fields of database records depending upon the values in other fields of those database records can request those records or rows from the application 202.

In addition to the division of rows among data storage facilities described with respect to FIG. 1, rows can also be duplicated across two or more facilities. In one implementation, the rows are organized into file system units called blocks. A block can contain a large number of rows. Block 1 is stored in both the first storage device 210 and the second storage device 216. For block 1, the first storage device 210 is the primary device. Where the devices are hard disk arrays, the primary device can be referred to as the primary array. The primary array is the array from which the data contained in block 1 is conventionally accessed. Under some circumstances, such as the failure of the first storage device 210 the data is block 1 is accessed from the redundant array, which for block 1 is the second storage device 216. When the data in block 1 is modified, the change occurs in both the primary and the secondary array in order to maintain the equivalency. In one implementation, different blocks are designated with opposite primary and redundant arrays. For example, if a set of blocks is stored on two hard disk arrays, one approach would be to have every other block have the first storage device 210 as its primary array and the second storage device 216 as its redundant array, while the remaining blocks each have the second storage device 216 as its primary array and the first storage device 210 as its redundant array. Under some circumstances, designating each storage device as the primary array for a roughly equal number of blocks reduces the maximum number of read requests received by a disk array and improves performance. Of course, if one storage device fails, the remaining device will handle all the requests and the initial distribution of primary and redundant status will no longer play a role.

In addition to having multiple storage devices for data accessed by the application 202. The system may also include multiple paths to each device. The first storage device 210 can be accessed by the application 202 through a first path 206 and a second path 208. The second storage device 216 can be accessed by the application 202 through a first path 212 and a second path 214. The paths can consist of electronic buses, optical links, interfaces, and other devices for transmitting data. In one implementation, a single path is used as the first path for both storage devices, while a different path is used as the second path for both devices. In another implementation, all four paths are different. In another implementation, more than two paths are provided to each storage device. The system may designate a path as the default path. For example, the system could access the first storage device 210 through the first path 206 unless some variable were changed, for example by a path designating instruction.

Figure 3:
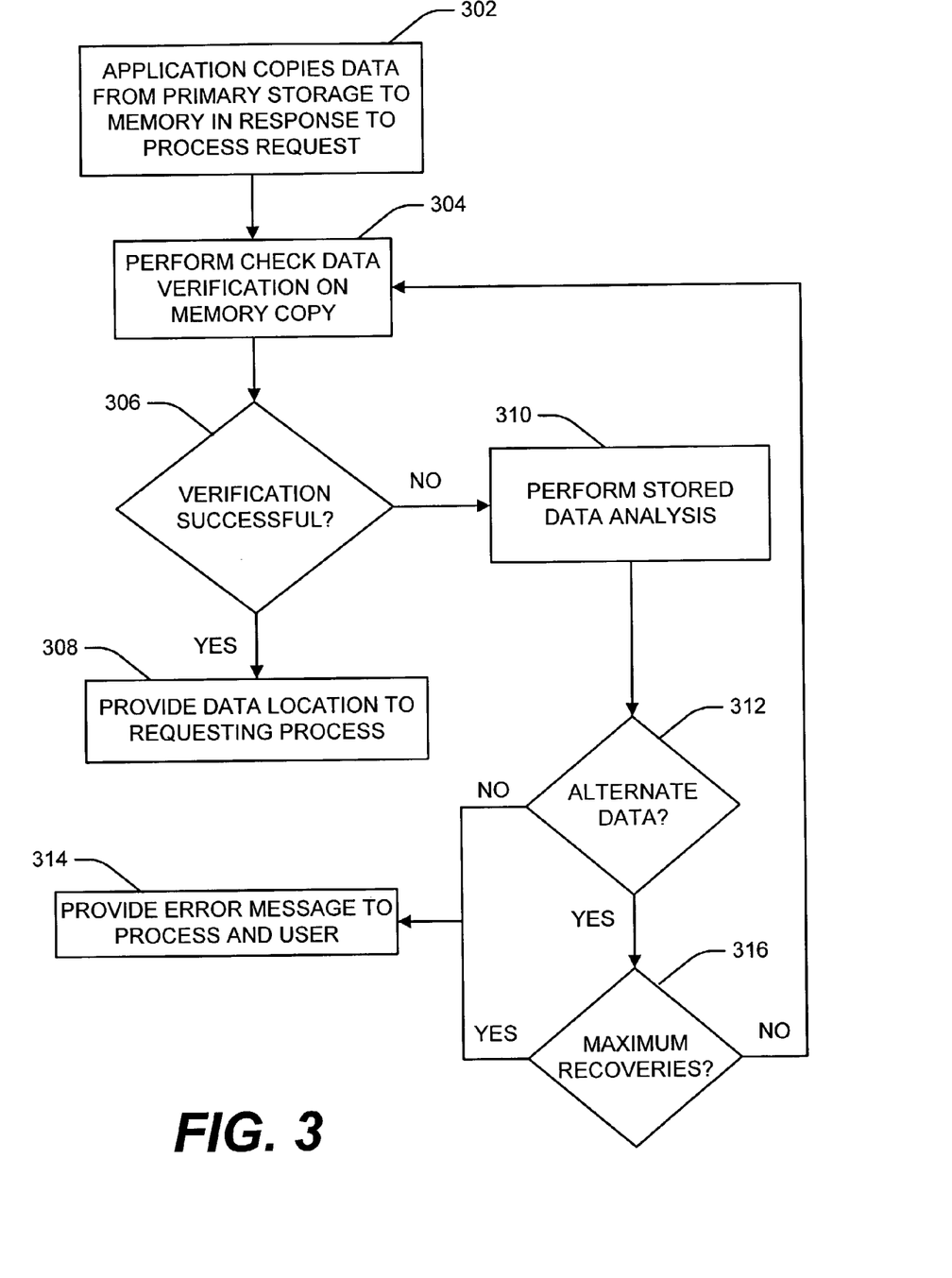
FIG. 3 is a flow diagram of a method of managing detected data corruption.

FIG. 3 depicts a flow diagram of a method of managing detected data corruption. The application copies data from primary storage to memory in response to a process request 302. A check data verification is performed on the memory copy 304. The check data verification can take a variety of forms including a check sum performed on the data. More generally, a function can be evaluated using a portion of the data. The function result is then compared to another portion of the data. The data can be stored in a plurality of different locations in memory. For example, the check data can be stored separately. If the result is identical, then the verification is successful. Otherwise, it is not. One such function would be to count the number of ones in a portion of digital data and compare it to a count contained at the end of the data. If the verification is successful 306, the application can provide the requesting process with the location of the data in memory 308. In another implementation, the process is provided with the actual data rather than a location. If the verification is not successful 306, a stored data analysis is performed 310. The stored data analysis 310 determines whether their is alternate data. If there is not alternate data 312, then an error message can be provided to the process and user 314. In one implementation, such error messages are not provided or are only provided to one of the process and the user. If there is alternate data 312, then the system checks whether a maximum number of recoveries has been reached 316. This parameter can be set to reduce the likelihood that the method will continuously evaluate alternate data without reaching resolution. In one implementation, the maximum number of recoveries is the product of the number of storage devices and the number of paths to each storage device. If the maximum number of recoveries has been reached 316, then an error message can be provided to the process and user 314. If the maximum number of recoveries has not been reached 316, then the alternate data can be used to reattempt verification 304.

Figure 4:
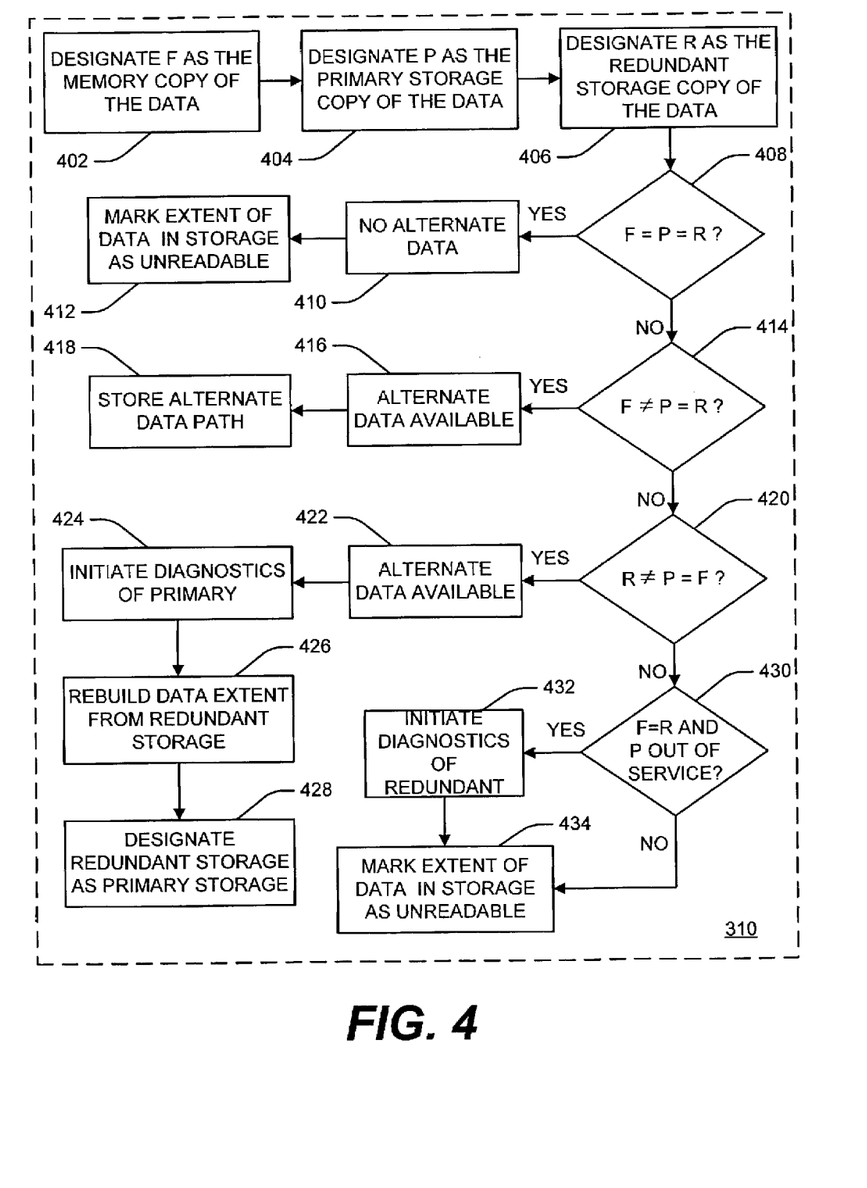
FIG. 4 is a flow diagram of a method of analyzing stored data.
Figure 5:
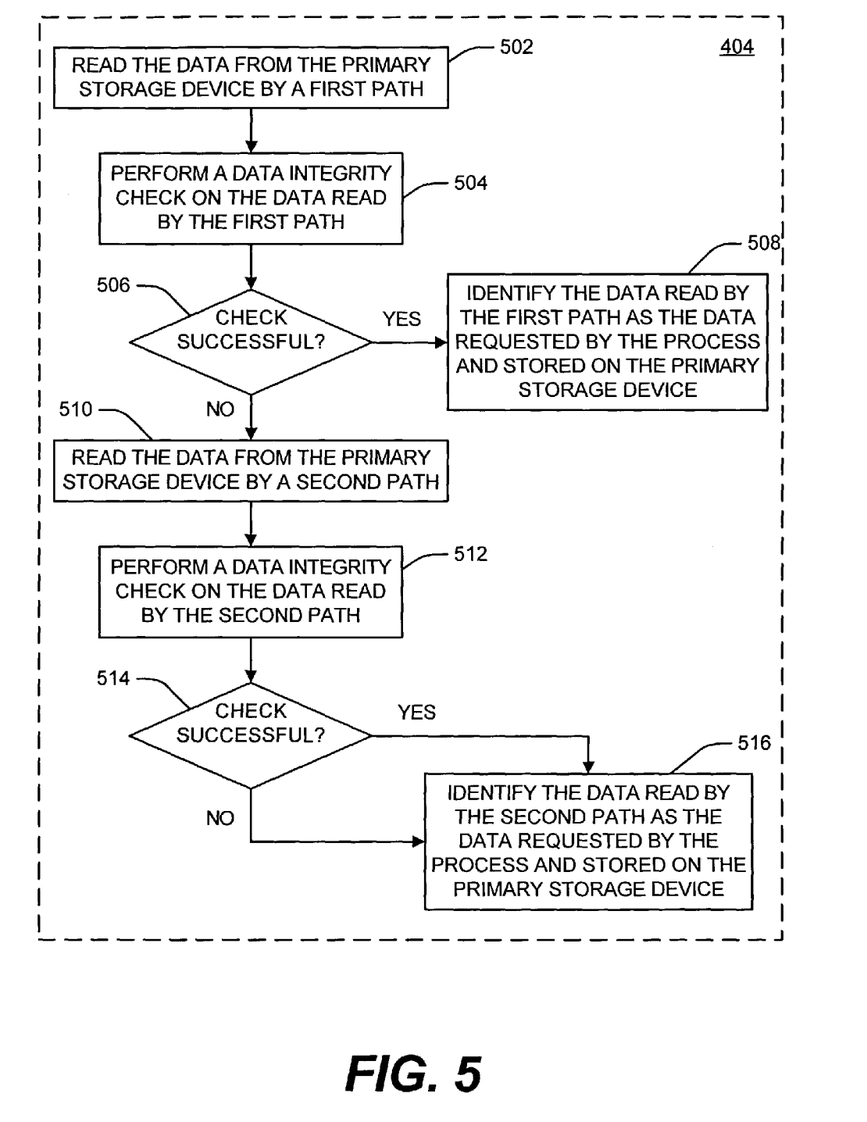
FIG. 5 is a flow diagram of a method of accessing storage through multiple paths.

FIG. 4 depicts, in a flow chart, one implementation of a method of analyzing stored data after data corruption has been identified at the application level. The memory copy of the data is designated as F 402. The primary storage copy of the data is designated as P 404. The redundant storage copy of the data is designated as R 406. Both the primary storage copy of the data and the redundant storage copy of the data can be identified through one of multiple paths if the system include multiple paths. FIG. 5 illustrates an implementation of designating a value for data stored on a device accessible through multiple paths. If F, P, and R are identical 408, then no alternate data is identified 410 and the extent of the data is marked as unreadable 412. The marking can be accomplished by sending an instruction to the storage subsystem that contains the devices. If P and R are identical, but different from F 414, then alternate data is available through a different path 416. A path designating instruction or other signal for storing the alternate data path is then generated 418. If P and F are identical, but different from R 420, then alternate data is available in the redundant storage 422. The system then initiates diagnostics of the primary 424 and rebuilds the data extent from the redundant storage 426. The redundant storage is designated as primary storage 428. If the primary is out of service and F and R are identical 430, the system initiates diagnostics of the redundant storage 432 and marks the data extent as unreadable. If none of the conditions are met 430, the data is marked as unreadable 434.

FIG. 5 is a flow diagram of a method of accessing storage through multiple paths. While FIG. 5 shows one implementation for reading the value from the primary storage 404 where two paths are available, the same method can be used for redundant storage. In another implementation, the method is expanded for more than two paths to a storage device. The data is read from the primary storage device by a first path 502. A data integrity check is performed on that data 504. If the check is successful 506, the data read by the first path is identified as the data requested by the process and stored on the primary storage device 508. If the check is unsuccessful 506, the data is read from the primary storage device by a second path 510. A data integrity check is performed on that data 512. Whether or not the check is successful 514, the data read by the second path is identified as the data requested by the process and stored on the primary storage device 516. In another implementation, no data integrity check is performed on the data read by the second path. In another implementation, an unsuccessful check of the second path data 514, results in an error rather than the identification of 516. In another implementation, additional paths are checked when the first two paths do not result in verifiable data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for managing data corruption identified by an application in a storage subsystem, comprising the steps of:
    a. copying data requested of the application by a process from a primary storage device in the storage subsystem to a memory;
    b. performing a data integrity check on the data stored in the memory;
    c. concluding that the data integrity check has indicated that data corruption exists; and
    d. upon concluding that data corruption exists,
        d1. identifying the data requested by the process and stored on the primary storage device in the storage subsystem,
        d2. identifying the data requested by the process and stored on a redundant storage device in the storage subsystem,
        d3. comparing the data stored in the memory as a first copy, the identified data stored on the primary storage device as a second copy, and the identified data stored on the redundant storage device as a third copy; and
        d4. choosing at least one of a group of instructions to be transmitted from the application to the storage subsystem based at least in part on the comparison of the first, second, and third copies.

2. The method of claim 1, wherein the application only accepts data requests from processes in one or more file system blocks.

3. The method of claim 1, wherein the step of performing the data integrity check includes calculating a result of a function using at least a portion of the data and comparing the result to at least a portion of the data.

4. The method of claim 1, wherein the data is a file system block that includes a checksum.

5. The method of claim 1, wherein step d4 comprises choosing an instruction to mark the data as unreadable to be transmitted from the application to the storage subsystem when the first, second, and third copies are identical.

6. The method of claim 1, wherein step d4 comprises choosing an instruction to rebuild the data stored on the primary storage device based on the data stored on the redundant storage device to be transmitted from the application to the storage subsystem when the first and second copies are identical and both are different from the third copy.

7. The method of claim 1, wherein step d4 comprises choosing a path designating instruction when the third and second copies are identical and both are different from the first copy.

8. The method of claim 1, wherein the step of identifying the data requested by the process and stored on the primary storage device comprising:
    d11. reading the data from the primary storage device by a first path;
    d12. performing a data integrity check on the data read by the first path;
    d13. if the data integrity check succeeds, identifying the data read by the first path as the data requested by the process and stored on the primary storage device;
    d14. if the data integrity check fails, reading the data from the primary storage device by a second path;
    d15. if the data integrity check fails, performing a second data integrity check on the data read by the second path; and d16. if the second data integrity check succeeds, identifying the data read by the second path as the data requested by the process and stored on the primary storage device.

9. The method of claim 1, wherein the step of identifying the data requested by the process and stored on the redundant storage device comprising:
   d21. reading the data from the redundant storage device by a first path;
   d22. performing a data integrity check on the data read by the first path;
   d23. if the data integrity check succeeds, identifying the data read by the first path as the data requested by the process and stored on the redundant storage device;
   d24. if the data integrity check fails, reading the data from the redundant storage device by a second path;
   d25. if the data integrity check fails, performing a second data integrity check on the data read by the second path; and
   d26. if the second data integrity check succeeds, identifying the data read by the second path as the data requested by the process and stored on the redundant storage device.

10. The method of claim 1, further comprising the step of:
    d5. generating an error based at least in part on the comparison of the first, second, and third copies.

11. The method of claim 1, wherein the primary storage device for particular data requested by a process is the redundant storage device for different data requested by the process.

12. The method of claim 1, further comprising the step of:
    d5. providing one of the group of the second copy and the third copy from the application to the process.

13. A database system for managing data corruption identified by a database application, the system comprising:
    one or more nodes;
    a plurality of CPUs, each of the one or more nodes providing access to one or more CPUs;
    a plurality of virtual processes, each of the one or more CPUs providing access to one or more virtual processes;
    each virtual process configured to manage data, including rows from database tables, stored in one of a plurality of data-storage facilities, at least a portion of the data stored in both primary and redundant storage devices in the data storage facilities;
    a database application coupled to the virtual processes and configured to
    a. copy data requested by a virtual process from a primary storage device in the data storage facilities to a memory;
    b. perform a data integrity check on the data stored in the memory;
    c. conclude that the data integrity check has indicated that data corruption exists; and
    d. upon concluding that data corruption exists,
       d1. identify the data requested by the virtual process and stored on the primary storage device,
       d2. identify the data requested by the virtual process and stored on a redundant storage device in the data storage facilities,
       d3. compare the data stored in the memory as a first copy, the identified data stored on the primary storage device as a second copy, and the identified data stored on the redundant storage device as a third copy; and
       d4. choose at least one of a group of instructions to be transmitted to the in the data storage facilities based at least in part on the comparison of the first, second, and third copies.

14. The database system of claim 13, wherein the application only accepts data requests from virtual processes in one or more file system blocks.

15. The database system of claim 13, wherein the application performs the data integrity check by calculating a result of a function using at least a portion of the data and comparing the result to at least a portion of the data.

16. The database system of claim 13, wherein the data is a file system block that includes a checksum.

17. The database system of claim 13, wherein step d4 comprises choosing an instruction to mark the data as unreadable to be transmitted to the data storage facilities when the first, second, and third copies are identical.

18. The database system of claim 13, wherein step d4 comprises choosing an instruction to rebuild the data stored on the primary storage device based on the data stored on the redundant storage device to be transmitted to the data storage facilities when the first and second copies are identical and both are different from the third copy.

19. The database system of claim 13, wherein step d4 comprises choosing a path designating instruction when the third and second copies are identical and both are different from the first copy.

20. The database system of claim 13, wherein the application identifies the data requested by the virtual process and stored on the primary storage device by
    d11. reading the data from the primary storage device by a first path;
    d12. performing a data integrity check on the data read by the first path;
    d13. if the data integrity check succeeds, identifying the data read by the first path as the data requested by the virtual process and stored on the primary storage device;
    d14. if the data integrity check fails, reading the data from the primary storage device by a second path;
    d15. if the data integrity check fails, performing a second data integrity check on the data read by the second path; and
    d16. if the second data integrity check succeeds, identifying the data read by the second path as the data requested by the virtual process and stored on the primary storage device.

21. The database system of claim 13, wherein the application identifies the data requested by the virtual process and stored on the redundant storage device by:
    d21. reading the data from the redundant storage device by a first path;
    d22. performing a data integrity check on the data read by the first path;
    d23. if the data integrity check succeeds, identifying the data read by the first path as the data requested by the virtual process and stored on the redundant storage device;
    d24. if the data integrity check fails, reading the data from the redundant storage device by a second path;
    d25. if the data integrity check fails, performing a second data integrity check on the data read by the second path; and
    d26. if the second data integrity check succeeds, identifying the data read by the second path as the data requested by the virtual process and stored on the redundant storage device.

22. The database system of claim 13, wherein the application is also configured to generate an error based at least in part on the comparison of the first, second, and third copies.

23. The database system of claim 13, wherein the primary storage device for particular data requested by a virtual process is the redundant storage device for different data requested by the virtual process.

24. The database system of claim 13, wherein the application is also configured to provide one of the group of the second copy and the third copy from the application to the virtual process.

25. A computer program, stored in a tangible medium, for managing data corruption identified in a storage subsystem, the program comprising executable instructions that cause a computer to:
　a. copy data requested by a process from a primary storage device in the storage subsystem to a memory;
　b. perform a data integrity check on the data stored in the memory;
　c. conclude that the data integrity check has indicated that data corruption exists; and
　d. upon concluding that data corruption exists,
　　d1. identify the data requested by the process and stored on the primary storage device,
　　d2. identify the data requested by the process and stored on a redundant storage device in the storage subsystem,
　　d3. compare the data stored in the memory as a first copy, the identified data stored on the primary storage device as a second copy, and the identified data stored on the redundant storage device as a third copy; and
　　d4. choose at least one of a group of instructions to be transmitted to the in the data storage facilities based at least in part on the comparison of the first, second, and third copies.

26. The computer program of claim 25, wherein the executable instructions cause the computer to only accept data requests from processes in one or more file system blocks.

27. The computer program of claim 25, wherein the executable instructions cause the computer to perform the data integrity check by calculating a result of a function using at least a portion of the data and comparing the result to at least a portion of the data.

28. The computer program of claim 25, wherein the data is a file system block that includes a checksum.

29. The computer program of claim 25, wherein step d4 comprises choosing an instruction to mark the data as unreadable to be transmitted from the application to the storage subsystem when the first, second, and third copies are identical.

30. The computer program of claim 25, wherein step d4 comprises choosing an instruction to rebuild the data stored on the primary storage device based on the data stored on the redundant storage device to be transmitted from the application to the storage subsystem when the first and second copies are identical and both are different from the third copy.

31. The computer program of claim 25, wherein step d4 comprises choosing a path designating instruction when the third and second copies are identical and both are different from the first copy.

32. The computer program of claim 25, wherein the executable instructions cause the computer to identify the data requested by the process and stored on the primary storage device by
　d11. reading the data from the primary storage device by a first path;
　d12. performing a data integrity check on the data read by the first path;
　d13. if the data integrity check succeeds, identifying the data read by the first path as the data requested by the virtual process and stored on the primary storage device;
　d14. if the data integrity check fails, reading the data from the primary storage device by a second path;
　d15. if the data integrity check fails, performing a second data integrity check on the data read by the second path; and
　d16. if the second data integrity check succeeds, identifying the data read by the second path as the data requested by the virtual process and stored on the primary storage device.

33. The computer program of claim 25, wherein the executable instructions cause the computer to identify the data requested by the process and stored on the redundant storage device by:
　d21. reading the data from the redundant storage device by a first path;
　d22. performing a data integrity check on the data read by the first path;
　d23. if the data integrity check succeeds, identifying the data read by the first path as the data requested by the process and stored on the redundant storage device;
　d24. if the data integrity check fails, reading the data from the redundant storage device by a second path;
　d25. if the data integrity check fails, performing a second data integrity check on the data read by the second path; and
　d26. if the second data integrity check succeeds, identifying the data read by the second path as the data requested by the process and stored on the redundant storage device.

34. The computer program of claim 25, wherein the executable instructions cause the computer to generate an error based at least in part on the comparison of the first, second, and third copies.

35. The computer program of claim 25, wherein the primary storage device for particular data requested by a process is the redundant storage device for different data requested by the process.

36. The computer program of claim 25, wherein the executable instructions cause the computer to provide one of the group of the second copy and the third copy from the application to the process.

* * * * *